United States Patent [19]

Inujima et al.

[11] Patent Number: 4,995,706
[45] Date of Patent: * Feb. 26, 1991

[54] LIQUID CRYSTAL DEVICE WITH A FERROELECTRIC THIN FILM

[75] Inventors: Takashi Inujima, Atsugi; Shunpei Yamazaki, Tokyo; Toshimitsu Konuma; Toshiji Hamatani, both of Atsugi; Mitsunori Sakama, Hiratsuka; Toshiharu Yamaguchi, Zama; Ippei Kobayashi, Atsugi, all of Japan

[73] Assignee: Semiconductor Energy Laboratory Co., Ltd., Kanagawa, Japan

[*] Notice: The portion of the term of this patent subsequent to Jul. 25, 2006 has been disclaimed.

[21] Appl. No.: 394,265

[22] Filed: Aug. 14, 1989

Related U.S. Application Data

[63] Continuation of Ser. No. 282,850, Dec. 9, 1988, abandoned, which is a continuation of Ser. No. 934,911, Nov. 25, 1986, abandoned.

[30] Foreign Application Priority Data

Nov. 25, 1985 [JP] Japan .................. 60-265333

[51] Int. Cl.$^5$ .................................. G02F 1/13
[52] U.S. Cl. .................. 350/350 S; 350/341; 350/336; 350/339 R
[58] Field of Search .............. 350/350 S, 339 R, 340, 350/341, 334, 336, 333; 340/718, 765, 784

[56] References Cited

U.S. PATENT DOCUMENTS

| | | | |
|---|---|---|---|
| 3,725,899 | 4/1973 | Greubel | 350/339 R |
| 3,730,607 | 5/1973 | Grabmaier et al. | 350/339 R |
| 3,832,033 | 8/1984 | Furuhata et al. | 350/339 R |
| 4,021,798 | 5/1977 | Kojima et al. | 350/336 |
| 4,040,720 | 8/1977 | York | 350/339 R |
| 4,469,408 | 9/1984 | Krüger et al. | 350/339 R |
| 4,474,432 | 10/1984 | Takamatsu et al. | 350/339 R |
| 4,494,824 | 1/1985 | Nakamura et al. | 350/339 R |
| 4,563,059 | 1/1986 | Clark et al. | 350/330 |
| 4,613,209 | 9/1986 | Goodby et al. | 350/350 S |
| 4,634,228 | 1/1987 | Iwasaki et al. | 350/350 S |
| 4,639,089 | 1/1987 | Okada et al. | 350/350 S |
| 4,735,492 | 4/1988 | Sekine et al. | 350/341 |
| 4,790,631 | 12/1988 | Yamazaki | 350/350 S |
| 4,792,211 | 12/1988 | Harada et al. | 350/350 S |
| 4,850,680 | 7/1989 | Yamazaki et al. | 350/350 S |

FOREIGN PATENT DOCUMENTS

0155795 12/1979 Japan .................. 340/718

OTHER PUBLICATIONS

Francombe-"Ferroelectric Films and Their Device Applications" Thin Solid Films, 13-1972-pp. 413-433.
Shu-yau Wu-"A New Ferroelectric Memory Device ... Transistor" pp. 499-504-IEEE Transactions on Electronic Devices-vol. 21, No. 8-1974.

*Primary Examiner*—Stanley D. Miller
*Assistant Examiner*—Tai V. Duong
*Attorney, Agent, or Firm*—Sixbey, Friedman, Leedom & Ferguson

[57] ABSTRACT

An improved liquid crystal device which is driven by applying electric field thereon is shown. The liquid crystal is contained in the device as a layer which is separated into pixel and the optical condition of which is changed by the electric field applied. Contiguous to the liquid crystal layer, a ferroelectric film is provided to impart hysteresis to the device.

8 Claims, 1 Drawing Sheet

LIQUID CRYSTAL DEVICE WITH A FERROELECTRIC THIN FILM

This application is a continuation of Ser. No. 07/282,850, filed 12/9/88, now abandoned, which itself was a continuation of application Ser. No. 06/934,911, filed 11/25/86, now abandoned.

BACKGROUND OF THE INVENTION

This invention relates to a liquid crystal device, more particularly relates to a device which can be driven by application of electric voltage.

Smectic liquid crystal devices have been employed for displays of microcomputers, word processors, television systems and so forth, due to high contrast indicating ability. Also smectic liquid crystals have been considered promising as competitive media for memory devices such as disc memories and for applications to such audio-instruments as speakers.

There have been known a smectic liquid crystal device comprising a pair of substrates opposing to each other with a liquid crystal layer therebetween, a pair of electrodes provided on the opposed insides of the substrates and also a pair of oriented films symmetrically provided on the electrodes, in which a simple matrix structure or an active element structure with non-linear devices connected in series. A very important characteristic of such a liquid crystal device is a large coersive electric field Ec (threshold electric field). The large Ec makes it possible to hold the liquid crystal layer in an initial condition, for example, in an opaque condition, when the electric field applied to the layer is less than a certain strength. And, when the applied electric field increases to a level beyond the strength, the liquid crystal layer changes abruptly its condition into a transparent condition, and vice versa. In this regard, the coersive electric field Ec takes a positive value Ec+ (a theshold value observed when applied with a positive voltage), and a negative value Ec− (a threshold value observed when applied with a negative voltage). Although Ec+ and Ec− are not necessarily the same, both can be about equal in virtue of a processing condition of an orientation treatment on surfaces contiguous to a liquid crystal layer.

However, such a smectic liquid crystal layer exhibits a very faint hysterisis, namely, has very smalland unstable Ec+ and Ec−. Especially, in a smectic layer in a chiral C phase, the value of Ec depends largely on the strength of pulsed electric field applied to the layer. Hence, an excitation system known as AC bias method has been employed in which a negative pulse signal is applied in advance of rewriting in a positive direction, and then a positive pulse is applied under a finely controlling in terms of the strength of electric field applied and the applying time, and in inverse, when rewriting in a negative direction is desired, a procedure must be taken in a same manner in that the direction of electric field is reversed. The AC bias method makes a circumferential circuit very complicated.

Accordingly, it is required to make a liquid crystal device with a circumferential circuit being less complicated than that having an AC bias method. On the other hand, the bias method seems indespensible to implement a liquid crystal device as long as liquid crystal layer has only a slight Ec. There are same attempts to make a liquid crystal layer with a stable Ec. However, they are compromising its frequency characteristics.

SUMMARY OF THE INVENTION

To solve the above problems, a device according to the invention is provided with a ferroelectric film proximately close to a liquid crystal layer so that the device exhibits an apparent hysteresis in response to the electric field applied to the liquid crystal layer. The ferroelectric film has a thickness of, for example less than 1,000 Å, more preferably 200 to 300 Å and is preferably transparent but, an optical anisotropy is not desirable. According to the invention, there can be an intermediate layer between the ferroelectric film and the liquid crystal so far as the effect of displacement in the ferroelectric film reaches the liquid crystal.

It is therefore an object of the invention to provide a liquid crystal device which can be accurately driven by applying electric field.

It is another object of the invention to provide a liquid crystal device having a certain value of its coersive force in response to the electric field applied thereon.

It is a further object of the invention to provide a liquid crystal device capable of exhibiting an apparent hysteresis.

DETAILED DESCRIPTION OF THE PREFERRED EMBODIMENT

Figure 1:
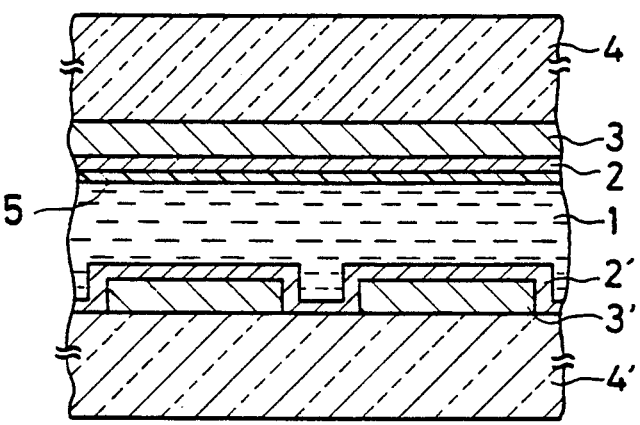
FIG. 1 is a cross section view showing an embodiment of the invention.

Referring to FIG. 1, a liquid crystal device according to the invention is illustrated. To facilitate the understanding the concept of the invention, the theoretical explanation will be made in advance. The device comprises a pair of substrates 4 and 4′, a pair of transparent electrodes 3 and 3′ and a pair of oriented films 2 and 2′ each provided on the substrates respectively and a ferroelectric liquid crystal layer (referred to as FLC layer hereafter) disposed therebetween. The oriented film 2 is made from an ferroelectric substance so that is is referred to as FE film hereinafter.

Figure 2:
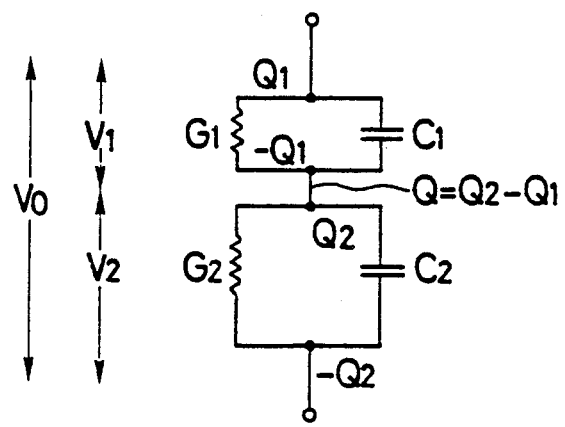
FIG. 2 is an equivalent circuit diagram of the embodiment shown in FIG. 1.

The electric characteristics of the device can be represented with an equivalent circuit as shown in FIG. 2 in which $G_2$ and $C_2$ are the conductance and the capacitance of the FLC layer 1 restectively and $G_1$ and $C_1$ are the conductance and the capacitance of the FE film 2. When a voltage $V_o$ is applied to the circuit, the voltage $V_1$ across $C_1$ or $G_1$ and the charge $Q_1$ accumulated on the FE film and the voltage $V_2$ across $C_2$ or $G_2$ and the charge $Q_2$ accumulated on the liquid crystal layer 1, are calculated at $t=0$ as follows:

$$V_o = V_1 + V_2,$$

$$V_1 = V_o C_2/(C_1 + C_2),$$

$$V_2 = V_o C_1/(C_1 + C_2).$$

Practically, the thickness of the FE film 2 is 200 to 300 Å and the thickness of the FLC layer is 2 to 3 microns so that $C_1$ is substantially larger than $C_2$. Thereby is established $V_2 \approx 0$ and almost all the voltage applied to the device is applied to the FLC layer at the initial stage.

Further, the charge Q accumulated on the interface between the FE film and the FLC layer is calculated according to the equation, $$Q = V_o(C_2G_1 - C_1G_2)/(G_1+G_2) \times [1 - \exp(-(G_1+G_2)/(C_1+C_2))].$$

By using the relation, $C_1 > C_2$, and $G_1 \approx 0$ which is derived from the fact that the FE film shall be insulating, this general equation can be simplified as;

$$Q = -C_1 V_o[1 - \exp(-G_2 t/C_1)] = Q_2 - Q_1.$$

The calculation results are $$V_1 = Q_1/C_1,$$

$$V_2 = Q_2/C_2,$$

$$V_o = V_1 + V_2 = Q_2/C_2 + Q_1/C_1.$$

$$\begin{aligned} Q_2 &= C_1 V_1 - C_1 V_o[1 - \exp(-G_2 t/C_1)] \\ &= C_2(V_o - V_1). \end{aligned}$$

These equations can be rearranged into $$V_1(C_1+C_2) = C_2 V_o + C_1 V_o - C_1 V_o[1 - \exp(-G_2 t/C_1)],$$

$$V_1 = V_o - C_1 V_o \exp(-G_2 t/C_1)/(C_1+C_2).$$

After sufficient time elapses, $V_1$ can be considered equal to $V_o$.

Namely, at the initial moment of voltage application, almost all the voltage is applied to the FLC layer, then after a certain time, the FE film 2 is subjected to almost all the voltage instead. In other words, the applied voltage is devoted to the FLC layer to change its condition, thereafter the voltage is devoted to the FE film 2 to cause an electric displacement.

Accordingly, even if the FLC layer itself has only a slight Ec, the liquid crystal device can demonstrate a desirable hysteresis by employing a suitable FE film having itself a stable and relatively large Ec.

With such a large and certain Ec, it is possible to accomplish a display with no cross-talking even in a device having 720×480 pixels.

Heretobelow, the embodiment of the invention will be made in conjunction with the figures in detail. In FIG. 1, the transparent electrodes 3' are arranged in the form of parallel strips extending in the direction normal to the drawing paper. Also the transparent electrodes 3 in the form of parallel strips are arranged orthogonal to the strips 3', eventually preparing pixels in the form of a matrix at their crossing points. The oriented film 2 as the FE film is made from a copolymer composed of polyvinylidenefluoride, $(CH_2CF_2)n$ called VDF and trifluoroethylene (TrFE). The copolymer is used as a solution at 10 weight % diluted with methyl-ethyl-keton to be applied on the electrode 3 by a spining method. The thickness of the FE film can be controlled by adjusting the density of the copolymer in the solution and the angular speed of a spiner. The spread film is then heated to evaporate the solvent. Further on the Fe film is formed an oriented film made of 6-nylon. The other oriented film is made from 1.1.1.,3.3.3. hexa-trimethyl-silazan $(C_6H_{19}NSi_2)$ and may not oriented unlike the opposite film.

Next, the substrates 4 and 4' thus provided with the oriented film and the electrodes 3 and 3' are joined and the perimeter thereof is sealed off, and then liquid crystal is injected between the opposed substrates 4 and 4'. The liquid crystal is a blend of F8 and B7. As another liquid crystal, a blend of OMOOPO and MBRA can be used also. Other suitable liquid crystals are disclosed in Japanese Published Application Nos. sho56-107216, sho59-98051 and sho59-118744.

EXPERIMENTAL

Figure 3:
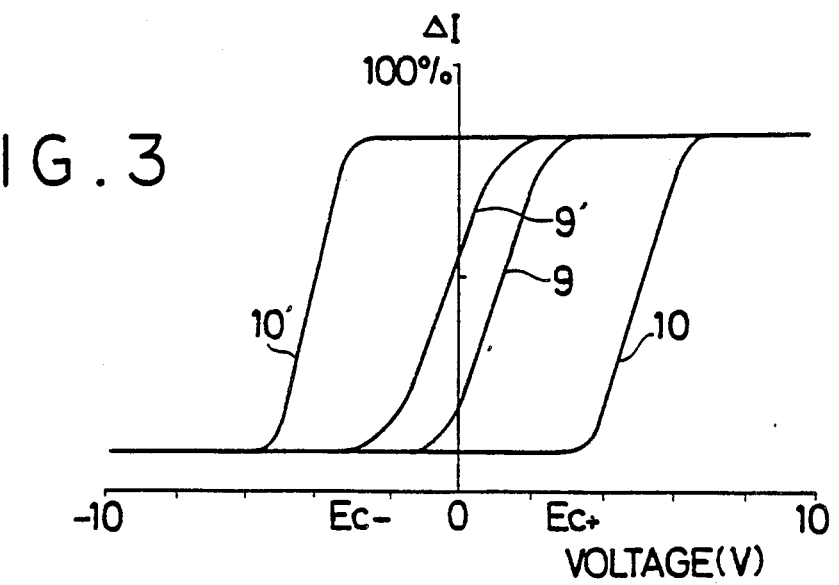
FIG. 3 is a graphical diagram showing the hysteresis loop of the embodiment shown in FIG. 1 and the hysteresis loop of a prior art device.

In response to the electric voltages of ±10 V applied to each pixel, the FEC layer demonstrated an apparent Ec. FIG. 3 is a graphical diagram showing the hysteresis of the liquid crystal device according to the invention. The abscissa is the applied voltage and the ordinate is the transparency of the liquid crystal layer. In the figure, curves 9 and 9' represent a hysteresis loop of a conventional device in which only silane coupling agent was used. The Ec+ and Ec− were not only very slight as shown in the figure but also very unstable. On the contrary, according to the invention, a well-formed hysteresis loop was plotted as shown with curves 10 and 10' and the Ec+ and Ec− were comparatively large.

Although the above description has been made in conjunction with a particular embodiment, the invention shall not be limited thereto but only to the appending claims, and many modifications may be considered as follow:

In place of rubbing method to orient inside of the substrate, other orientation method can be employed, for example a temperature graduation method, a shearing method and so on. The shearing method is carried out by making a displacement of a pair of substrate between which a liquid crystal layer is disposed.

A ferroelectric film accompanying a liquid crystal layer can be formed on either one of opposed inside of substrates, or both opposed insides. Also a known oriented film 5 may be superimposed on a ferroelectric film which has not oriented. Further a ferroelectric film may cover throughout the inside of a substrate, may cover only electrodes or may cover only pixels.

The invention can be applied also to speakers, printers, disc memory or other smectic liquid crystal appliances.

What is claimed is:

1. A liquid crystal device comprising:
    a pair of substrates;
    a ferroelectric liquid crystal layer interposed between said substrates;
    at least one first electrode formed on one of said substrates;
    a ferroelectric film having a thickness less than 1000 Å and interposed between said first electrode and said liquid crystal layer and made of an organic material comprising fluorine;
    at least one second electrode formed on the other substrate located opposing to said one first electrode so that the state of said liquid crystal layer is controlled by an electric field induced by the opposing electrodes where said electric field is applied across said liquid crystal layer and said ferroelectric film in series; and
    an organic film interposed between said second electrode and said liquid crystal layer.

2. A device of claim 1 wherein at least one of said substrates is transparent.

3. A device of claim 1 wherein said first and second electrodes are opposed electrodes respectively provided on the opposite insides of said substrates.

4. A device of claim 3 wherein said electrodes are designed in the form of strips arranged in parallel on the opposed surface, and opposing and orthogonal to each other.

5. A device of claim 1 wherein the inside of said ferroelectric film is oriented.

6. A device of claim 1 said ferroelectric film is made from polyvinylidenefluoride.

7. A device of claim 3 applied to a display.

8. A device of claim 1, further comprising an oriented film interposed between said ferroelectric film and said liquid crystal.

* * * * *